United States Patent [19]

Beebe

[11] Patent Number: 4,615,077
[45] Date of Patent: Oct. 7, 1986

[54] GAME SKINNING AID

[76] Inventor: Jay W. Beebe, Rte. 3, Box 190M, West Monroe, La. 71291

[21] Appl. No.: 816,153

[22] Filed: Jan. 3, 1986

[51] Int. Cl.$^4$ .............................................. A22B 1/00
[52] U.S. Cl. ...................................................... 17/44.2
[58] Field of Search ................... 17/44, 44.1, 44.2, 21

[56] References Cited

U.S. PATENT DOCUMENTS 3,137,030  6/1964  Varner ............................ 17/44.3 X
4,094,041  6/1978  Steed ............................... 17/44.1 X Primary Examiner—Willie G. Abercrombie
Attorney, Agent, or Firm—John M. Harrison

[57] ABSTRACT

A game skinning aid which is characterized by a shaped wire member configured to define a leg support having an apex bend at the top for securing the game skinning aid to a tree or other support and downwardly extending, diverging legs which terminate in pointed, forwardly extending, upturned contact segments. A cooperating head support extends downwardly from points of attachment to the legs and defines a loop at the bottom extension thereof to support the head of an animal. The game skinning aid is designed to alternately support the legs and head of an animal carcass to facilitate efficient skinning and dressing of the animal.

31 Claims, 6 Drawing Figures

GAME SKINNING AID

BACKGROUND OF THE INVENTION

1. Field of the Invention

This invention relates to devices for supporting game animals in order to better facilitate skinning and dressing the animals. More particularly, the invention relates to a game skinning aid which is characterized by a wire member featuring a leg support having a bend approximately in the middle thereof for attaching the leg support to a tree or other supporting structure and diverging, outwardly and downwardly extending legs which terminate in upturned, pointed contact segments. A head support extends from attachment to the legs downwardly between the contact segments and is characterized by a curve which defines a head support bend. Skinning of the animal is accomplished using the game skinning aid by initially securing the front or rear legs of the animal to the upward extending, pointed contact segments while skinning the upper body and subsequently reversing the carcass and suspending the head from the head support bend and skinning the lower body.

One of the problems realized in the skinning and dressing of small animals such as squirrels, raccoons, rabbits and like animals, is that of supporting and positioning the animal carcass in the proper orientation to achieve efficient skinning and dressing. Since the skinning technique requires the use of a knife while positioning the animal in a proper configuration to facilitate efficient use of the knife, it is very important to use a support of proper design in the skinning operation. It is frequently necessary to hang an animal carcass in an elevated, head-down position and sometimes in an elevated, head-up position, in order to properly skin and dress the carcass. In both cases the carcass should be supported in a secure manner and the support should allow ample working space to facilitate application of considerable force to the carcass in order to remove the skin and complete the dressing operation.

2. Description of the Prior Art

Various devices for suspending animal carcasses for skinning and dressing game are known in the art. An early invention entitled "Gambrel", is disclosed in U.S. Pat. No. 828,620, dated Aug. 14, 1906, to D. H. Martin. The Martin "Gambrel" is characterized by a pair of hooks, each of which is attached to elongated scissor means, with a separate, curved connector bar used to adjust the spacial relationship of the hooks with respect to each other. A "Suspension Device for Use in Skinning Small Animals" is disclosed in U.S. Pat. No. 1,027,335, dated May 21, 1912, to A. G. Huyerdahl. The Huyerdahl device is characterized by a U-shaped frame, the rear support of which is slidably adjustable to position the parallel, extending ends or fingers closer to or farther away from each other, as desired. The fingers extend from the support member in sets of two and the paired fingers in each set are joined by a thumb screw to facilitate securing the legs of an animal therebetween. U.S. Pat. No. 2,169,928, dated Aug. 15, 1939, to H. Saley, entitled "Gambrel", includes a ring, to which are pivotally attached a pair of rods having hooks secured to opposite ends thereof. A spacer bar is removably positioned between the ends of the rod to facilitate support of an animal carcass from the hooks. A "Small Game Hanging Device" is disclosed in U.S. Pat. No. 3,188,130, dated June 8, 1965, to S. P. Pietrowicz. The Pietrowicz device includes a tubular member having a length of cord extending therethrough, with the cord exiting the tubular member at both ends and at the center, in opposite directions. The end of the cord which exits the tubular member in the center is attached to a tree limb or other support, while the legs of the animal are secured in spaced relationship to the two ends of the cord which extend downwardly from opposite ends of the tubular member.

One of the problems which exists in prior art suspension members used for skinning and cleaning or dressing animal carcasses is that of the lack of facility to support both the head and the legs of the animal. This facility is often necessary in order to properly position the carcass to allow more efficient skinning and cleaning of the animal. Accordingly, it is an object of this invention to provide a game skinning aid which is characterized by a shaped wire member having spaced, upwardly extending contact segments for supporting the legs of an animal and a downwardly extending head support for supporting the head of the animal.

Another object of the invention is to provide a new and improved, substantially rigid game skinning aid which is shaped from heavy wire and is characterized by a pair of spaced, upwardly extending, pointed contact segments for receiving and supporting the legs of an animal and a curved head support extending downwardly between and beneath the contact segments to support the head of the animal.

Still another object of this invention is to provide a new and improved game skinning aid which can be used to skin and dress substantially any small animal and is characterized by a substantially rigid, shaped wire member having a pair of downwardly extending legs which join at the top in an apex bend for supporting the game skinning aid, extend outwardly and downwardly to define a pair of frontal bends and terminate at the bottom in sharp, upward turned, spaced contact segments for supporting the legs of an animal and further including a shaped head support which is welded or otherwise attached to the legs and loops downwardly between and below the contact segments for supporting the head of the animal.

Still another object of the invention is to provide a new and improved game skinning aid which is fashioned from two lengths of stainless steel wire to define a substantially rigid frame, which frame includes a leg support shaped to define an apex bend at the top for suspending the game skinning aid from a nail driven into a tree, the first leg support defining a pair of legs which extend downwardly from the apex bend in diverging relationship and terminate in upward standing, forwardly oriented, pointed contact segments for receiving the legs of an animal. The game skinning aid further includes a head support which is characterized by a pair of head support arms extending downwardly from welded attachment to the legs and projecting between the contact segments, the arms terminating at a head support bend which is shaped to support the head of the animal.

SUMMARY OF THE INVENTION

These and other objects of the invention are provided in a new and improved game skinning aid which is characterized in a preferred embodiment by a substantially rigid frame defined by a leg support having an apex bend in the top thereof and having downwardly and outwardly extending leg members diverging from the apex bend, the legs configured to define a pair of 90 degree frontal bends beneath the apex bend and terminating in pointed, spaced, upwardly extending contact segments for supporting the legs of an animal. The leg support is provided in combination with a shaped head support defined by a pair of head support arms extending downwardly between the contact segments from points of attachment to the legs, the arms terminating in a head support bend for supporting the head of the animal.

BRIEF DESCRIPTION OF THE DRAWING

The invention will be better understood by reference to the accompanying drawing, wherein.

DESCRIPTION OF THE PREFERRED EMBODIMENTS

Figure 1:
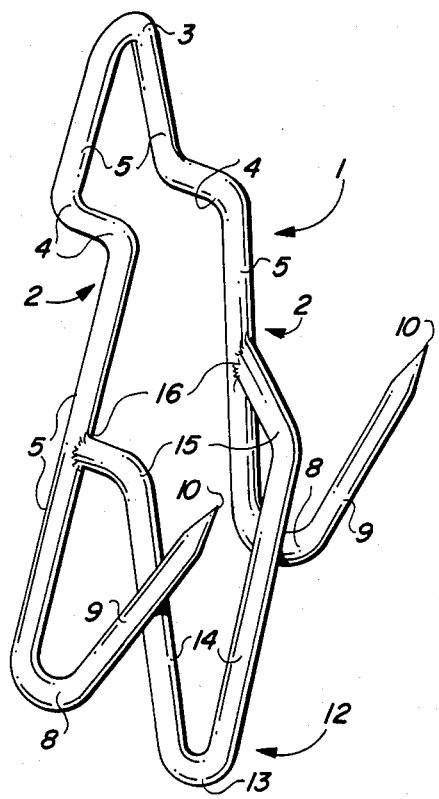
FIG. 1 is a perspective view of the game skinning aid of this invention.
Figure 2:
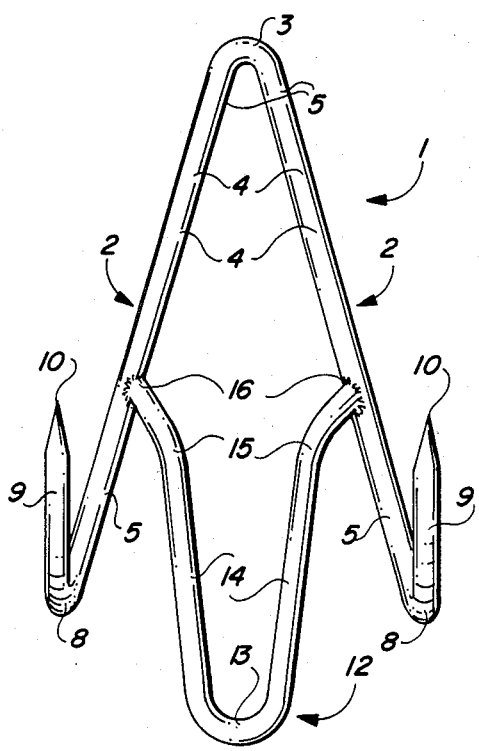
FIG. 2 is a front elevation of the game skinning aid illustrated in FIG. 1.
Figure 3:
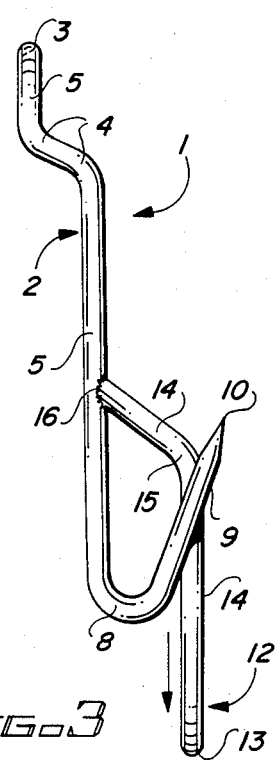
FIG. 3 is a side elevation of the game skinning aid illustrated in FIGS. 1 and 2.

Referring initially to FIGS. 1-3 of the drawing, the game skinning aid 1 is characterized by a generally A-shaped leg support 2, provided with an apex bend 3 at the top thereof. The leg support 2 defines a pair of legs 5, which extend downwardly in diverging relationship from the apex bend 3 and are each configured below the apex bend 3 to define double frontal bends 4. Accordingly, the lower segment of each of the legs 5 extends downwardly parallel to and forwardly of the upper segment of the legs 5 located between the frontal bends 4 and the apex bend 3, as illustrated. A support bend 8 is also provided in each of the legs 5 near the bottom thereof to define upwardly and forwardly extending contact segments 9, which are terminated by points 10. A head support is generally illustrated by reference numeral 12 and is shaped to define a head support bend 13 at the bottom thereof, with upwardly extending arms 14, provided with arm bends 15 near the welds 16, which join the arms 14 to the legs 5. In a most preferred embodiment of the invention the arms 14 are joined by the welds 16 to the legs 5 at points which lie approximately one-half the distance between the frontal bends 4 and the support bends 8 in the legs 5, respectively. Furthermore, the arms 14 extend outwardly and downwardly with respect to the legs 5 between the contact segments 9 of the game skinning aid 1 and between the lower segments of the arms 14. The lower segments of the arms 14 are located between the head support bend 13 and the arm bends 15 and are parallel to the legs 5, as illustrated in FIG. 3.

Figure 4A:
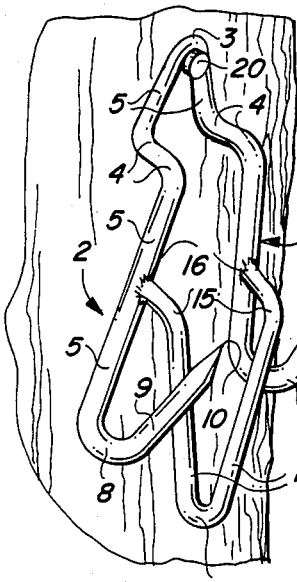
FIG. 4A is a perspective view of the game skinning aid illustrated in FIG. 1, mounted on a nail driven into a tree.

Referring now to FIGS. 3 and 4A of the drawing, the game skinning aid 1 is designed for attachment to a tree 11 or other supporting surface by means of a nail 20 or other appropriate fastener which is driven into the tree 11 beneath the apex bend 3. When the game skinning aid 1 is suspended from the nail 20 at the apex bend 3 as illustrated in FIG. 4A, that portion of the legs 5 which extend immediately below the apex bend 3 are located snugly against the tree 11, in order to position the lower portion of the legs 5 outwardly from the tree 11 by operation of the frontal bends 4, as illustrated. This positioning of the game skinning aid 1 facilitates room to undertake the skinning and dressing operation by maintaining the game carcass in spaced relationship with respect to the tree 11 or other supporting surface, whether the carcass is suspended from the contact segments 9 or the head support bend 13. Accordingly, referring again to FIG. 3, during the skinning operation the line of force to remove the skin from the carcass is downwardly, as indicated by the arrow and it is understood that the frontal bends 4 serve to space the animal carcass from the surface of the tree 11 while the skin is being removed. Furthermore, this alignment of pull or force is substantially the same, whether the animal carcass is suspended from the contact segments 9 or the arms 14, since the support bends 8 are located in close lateral proximity to the head support bend 13.

Figure 4B:
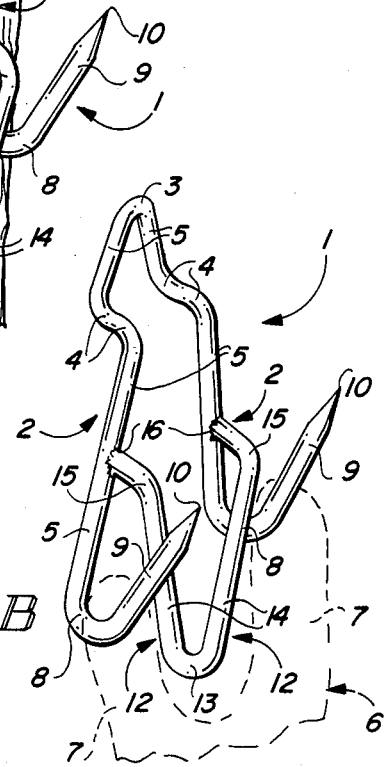
FIG. 4B is a perspective view of the game skinning aid illustrated in FIGS. 1 and 4A, more particularly illustrating the suspension of the legs of an animal from the contact segments of the game skinning aid.
Figure 4C:
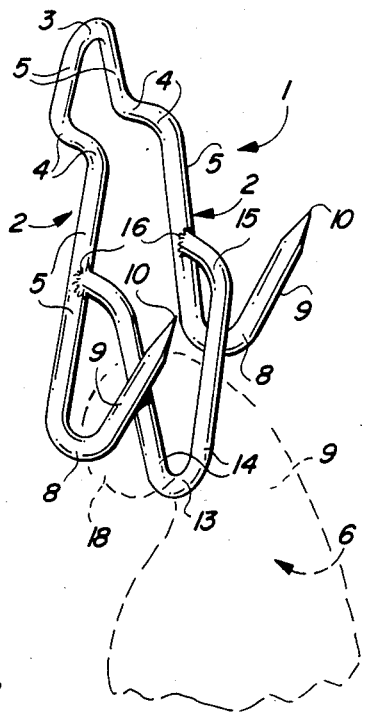
FIG. 4C is a perspective view of the game skinning aid illustrated in FIGS. 1 and 4A, more particularly illustrating the suspension of the head of an animal from the head support bend of the game skinning aid.

Referring now to FIGS. 4A-4C of the drawing, when a small animal such as the squirrel 6, illustrated in phantom in FIG. 4B, is suspended by means of the squirrel legs 7 from the contact segments 9 of the game skinning aid 1, the squirrel 6 can be easily partially skinned and dressed without the necessity of repositioning the carcass, if so desired. However, as illustrated in FIG. 4C, the head 18 and neck 19 of the squirrel 6 can also be placed in the head support bend 13 of the head support 12 and the remaining skin removed while the squirrel 6 is in this position, if so desired. Accordingly, it will be appreciated by those skilled in the art that many hunters prefer to skin and dress small animals by different techniques. For example, while one hunter may prefer to skin and dress a squirrel by suspending the animal from the legs only, another might well prefer to undertake the skinning and dressing operation by suspending the head, and some hunters use both techniques. it will be appreciated that the game skinning aid 1 of this invention facilitates use of either or both techniques by providing the contact segments 9 for supporting the legs of the animal as illustrated in FIG. 4B in a first operation, and the head support bend 13 as illustrated in FIG. 4C, to complete the skinning and dressing procedure. Still other hunters prefer using at least one supporting position more than once in the skinning operation. Under these circumstances, the skinning of a small game animal such as the squirrel 6 can be accomplished using the game skinning aid 1, as follows: referring initially to FIGS. 3 and 4B of the drawing, the points 10 terminating the contact segments 9 of the leg supports 2 are initially inserted between the rear tendon and leg bone in each rear leg, respectively, of a squirrel 6, with the back of the animal facing the hunter. A sharp knife is then used to partially skin the squirrel 6, beginning at a point just below the tail and extending downwardly about two inches along the carcass. The skin is then pulled down over the head by grasping the loose edge of the hide and pulling it downwardly in the direction of the arrow in FIG. 3. The excess hide is then trimmed from around the head and the squirrel legs 7 are removed from the contact segments 9, the carcass is reversed and the head 18 and neck 19 of the squirrel 6 are positioned in the head support bend 13, with the back of the animal facing the tree 11. The remaining segment of skin on the carcass is loosened with a knife and the hide is pulled downwardly in the direction of the arrow as illustrated in FIG. 6, over the feet of the carcass without removing the feet. The head of the squirrel 6 is then removed from the head support bend 13 and the rear legs 7 are again positioned on the contact segments 9 by repeating the procedure noted above. The gutting operation is then completed and field dressing of the animal is finished to the satisfaction of the hunter.

In a most preferred embodiment of the invention the game skinning aid of this invention is shaped from heavy stainless steel wire having a diameter of 3/16 of an inch. Referring again to FIGS. 2 and 3 of the drawing the game skinning aid 1 is most preferably fabricated by shaping a first length of wire into the configuration of the leg support 2, with the legs 5 shaped to define frontal bends 4 which are each characterized by 90 degree bends, and support bends 8. A second length of wire is then configured to define the head support 12, with the arms 14 shaped to create the head support bend 13 and the arm bends 15, and the ends of the arms 14 are then welded to the legs 5 at the welds 16. In another most preferred embodiment the diameter of both the leg support 2 and head support 12 is about 3/16 of an inch, the distance between the apex bend 3 and the second frontal bend 4 is about 1½ inches and the distance between the second frontal bend 4 and each of the support bends 8 is about 5¼ inches. Furthermore, the distance between the frontal bends 4 is about 1⅝ inches, the distance between the arm bends 15 and the head support bend is about 4⅛ inches, the length of the contact segments 9 is about 2 inches and the width of the head support bend is about ¾ of an inch. In a game skinning aid 1 having the above dimensions, the distance between each of the legs 5 and the points 10, respectively, is about 1⅝ of an inch, while the distance between the legs 5 and the arms 14, respectively, is about 1½ inches.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A game skinning aid for supporting game comprising a leg support shaped to define an apex bend, said leg support defining a pair of legs extending from said apex bend; a support bend provided in each of said legs, said support bend spaced from said apex bend and defining a pair of contact segments projecting in spaced, angular relationship from said support bend, respectively; a head support shaped to define a head support bend spaced from said apex bend, and a pair of arms extending from said head support bend toward said apex bend, said arms secured to said legs at points of attachment between said apex bend and said support bend, respectively.

2. The game skinning aid of claim 1 further comprising a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively.

3. The game skinning aid of claim 1 further comprising arm bends provided in each of said arms, said arm bends located in spaced relationship from said points of attachment, respectively.

4. The game skinning aid of claim 1 further comprising:
   (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
   (b) arm bends provided in each of said arms, said arm bends located in spaced relationship from said points of attachment, respectively.

5. The game skinning aid of claim 1 wherein said contact segments are shaped to define substantially sharp points at the extending ends thereof.

6. The game skinning aid of claim 1 wherein said contact segments are shaped to define substantially sharp points at the extending ends thereof and further comprising:
   (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
   (b) arm bends provided in each of said arms, said arm bends located in spaced relationship from said points of attachment, respectively.

7. The game skinning aid of claim 1 wherein said leg support and said head support are constructed of stainless steel.

8. The game skinning aid of claim 1 wherein said contact segments are shaped to define substantially sharp points at the extending ends thereof and said leg support and said head support are constructed of stainless steel and further comprising:
   (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
   (b) arm bends provided in each of said arms, said arm bends located in spaced relationship from said points of attachment, respectively.

9. The game skinning aid of claim 1 wherein said leg supports and said head support are constructed of stainless steel wire.

10. The game skinning aid of claim 9 wherein said contact segments are shaped to define substantially sharp points at the extending ends thereof.

11. The game skinning aid of claim 10 further comprising:
  (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
  (b) arm bends provided in each of said arms, said arm bends located in spaced relationship from said points of attachment, respectively.

12. The game skinning aid of claim 1 wherein said head support bend in said head support extends beyond said support bend in said legs.

13. The game skinning aid of claim 1 wherein:
  (a) said contact segments are shaped to define substantially sharp points at the extending ends thereof; and
  (b) said head support bend in said head support extends beyond said support bend in said legs.

14. The game skinning aid of claim 13 wherein said leg supports and said head support are constructed by stainless steel wire.

15. The game skinning aid of claim 14 further comprising:
  (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
  (b) arm bends provided in each of said arms, said arm bends located in spaced relationship from said points of attachment, respectively.

16. The game skinning aid of claim 4 wherein the segments of said arms located between said arm bend and said head support bend are substantially parallel to said legs.

17. The game skinning aid of claim 16 wherein:
  (a) said contact segments are shaped to define substantially sharp points at the extending ends thereof; and
  (b) said head support bend in said head support extends beyond said support bend in said legs.

18. The game skinning aid of claim 17 wherein said leg supports and said head support are constructed of stainless steel wire.

19. The game skinning aid of claim 1 wherein said contact segments extend from said support bend in substantially parallel relationship, respectively.

20. The game skinning aid of claim 1 wherein:
  (a) the segments of said arms located between said arm bend and said head support bend are substantially parallel to said legs; and
  (b) said contact segments extend from said support bend in substantially parallel relationship, respectively.

21. The game skinning aid of claim 20 wherein:
  (a) said contact segments are shaped to define substantially sharp points at the extending ends thereof; and
  (b) said head support bend in said head support extends beyond said support bend in said legs.

22. The game skinning aid of claim 21 further comprising:
  (a) a pair of frontal bends provided in spaced relationship in each of said legs, respectively, said frontal bends each defining a first leg segment extending from said apex bend to a first one of said frontal bends and a second leg segment extending from a second one of said frontal bends to said support bend, respectively, whereby said second leg segment is displaced from said first leg segment and is substantially parallel to said first leg segment, respectively; and
  (b) arm bends provided in each of said arms, said arm bends located in spaced relationship from said points of attachment, respectively.

23. A game skinning aid for supporting an animal carcass for skinning comprising:
  (a) a leg support provided with an apex bend, said leg support defining a pair of legs extending from said apex bend in angular relationship;
  (b) a first frontal bend provided in each of said legs in spaced relationship from said apex bend and a second frontal bend provided in each of said legs in spaced relationship with respect to said first frontal bend, said first frontal bend and said second frontal bend defining substantially parallel first leg segments and second leg segments in said legs, said first leg segments extending between said apex bend and said first frontal bend and said second leg segments offset from and substantially parallel to said first leg segments, said second leg segments extending from said second frontal bend, respectively;
  (c) a support bend provided in each of said second leg segments in spaced relationship with respect to said second frontal bend and pointed contact segments extending from said support bend in substantially parallel relationship, respectively;
  (d) a head support provided with a head support bend, said head support defining a pair of arms extending from said head support bend in angular relationship to points of attachment, respectively, on said legs, said points of attachment located substantially midway between said second frontal bend and said support bend, respectively; and
  (e) arm bends provided in said arms between said head support bend and said points of attachment, with that portion of said arms which are located between said head support bend and said arm bends provided in substantially parallel relationship with respect to said legs.

24. The game skinning aid of claim 23 wherein said leg support and said head support are constructed of stainless steel wire.

25. The game skinning aid of claim 23 wherein said head support bend in said head support extends beyond said support bend in said legs.

26. The game skinning aid of claim 23 wherein the segments of said arms located between said arm bend and said head support bend are substantially parallel to said legs.

27. The game skinning aid of claim 23 wherein:

(a) said leg support and said head support are constructed of stainless steel wire;
(b) said head support bend in said head support extends beyond said support bend in said legs; and
(c) the segments of said arms located between said arm bend and said head support bend are substantially parallel to said legs.

28. A game skinning aid for supporting an animal carcass for skinning and dressing the carcass, comprising:
(a) a wire leg support provided with an apex bend, said leg support defining a pair of legs extending from said apex bend in angular relationship;
(b) a first substantially 90 degree frontal bend provided in each of said legs in spaced relationship from said apex bend and a second substantially 90 degree frontal bend provided in each of said legs in spaced relationship with respect to said first frontal bend, said first frontal bend and said second frontal bend defining substantially parallel first leg segments and second leg segments in said legs, said first leg segments extending between said apex bend and said first frontal bend and said second leg segments offset from and substantially parallel to said first leg segments, said second leg segments extending from said second frontal bend, respectively;
(c) a support bend provided in each of said second leg segments in spaced relationship with respect to said second frontal bend and pointed contact segments extending from said support bend in substantially parallel relationship, respectively;
(d) a wire head support provided with a head support bend, said head support defining a pair of arms extending from said head support bend in angular relationship to points of attachment, respectively, on said legs, said points of attachment located substantially midway between said second frontal bend and said support bend, respectively; and
(e) arm bends provided in said arms between said head support bend and said points of attachment, with that portion of said arms which are located between said head support bend and said arm bends provided in substantially parallel relationship with respect to said legs.

29. The game skinning aid of claim 28 wherein said wire leg support and said wire head support are constructed of stainless steel.

30. The game skinning aid of claim 29 wherein said head support bend in said head support extends beyond said support bend in said legs.

31. The game skinning aid of claim 30 wherein said arms are welded to said legs.

* * * * *